J. S. PERESS.
FLEXIBLE JOINT FOR DIVING DRESSES.
APPLICATION FILED APR. 30, 1921.
1,402,645. Patented Jan. 3, 1922.
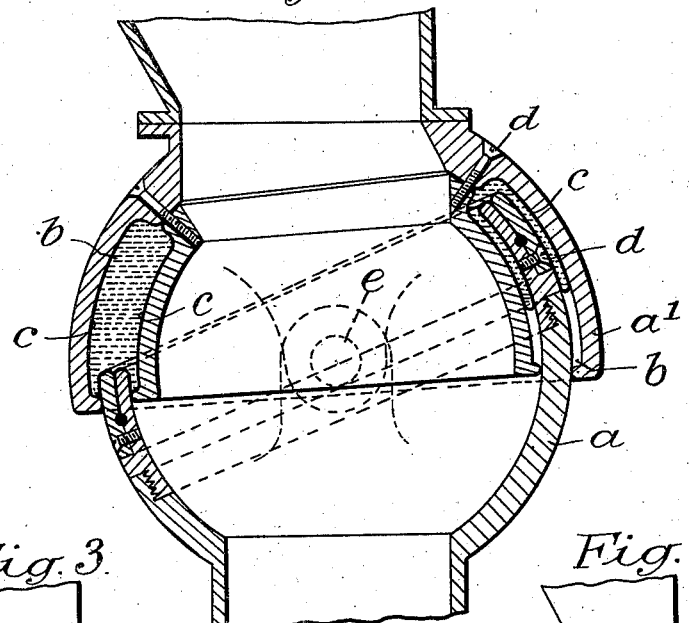
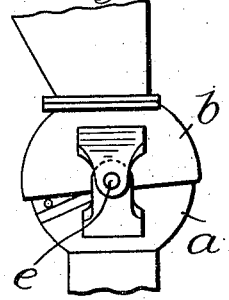
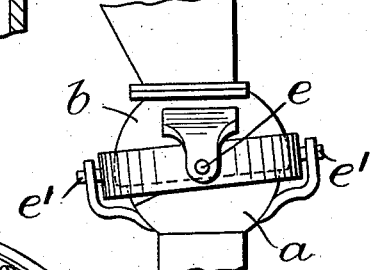
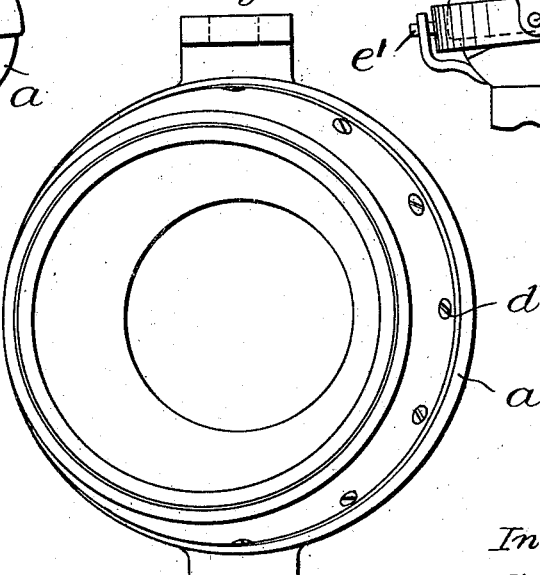
Inventor
Joseph Salim Peress
By H. O. Willson & Co.
Attorneys

UNITED STATES PATENT OFFICE.

JOSEPH SALIM PERESS, OF MANCHESTER, ENGLAND.

FLEXIBLE JOINT FOR DIVING DRESSES.

1,402,645.    Specification of Letters Patent.    Patented Jan. 3, 1922.

Application filed April 30, 1921. Serial No. 465,706.

*To all whom it may concern:*

Be it known that JOSEPH SALIM PERESS, of Norbury House, 20 Dickinson Street, Manchester, England, (whose post-office address is Norbury House, 20 Dickinson Street, Manchester, England,) has invented certain new and useful Improvements in Flexible Joints for Diving Dresses, (for which I have filed an application in Great Britain, Number 162, on January 2, 1920,) of which the following is a specification.

This invention for improvements in flexible joints for diving dresses relates to steel or similar rigid diving dresses which are constructed to resist the pressure of the water, at great depths and has for its object, to eliminate friction in the joints of the arm and leg coverings or other articulated parts, so that these members shall have freedom of movement notwithstanding the pressure of the water, also to provide an improved impermeable joint having great flexibility in use.

The invention consists in providing a fluid cushion or support between the relatively movable parts of the joint which is incompressible but readily displaceable to permit of the movements of the articulated members.

In the accompanying sheet of illustrative drawings—

Fig. 1 is a vertical section of a flexible joint constructed according to this invention.

Fig. 2 is a plan of the lowest part of same, Figs. 3 and 4 are side elevations of flexible joints drawn on a smaller scale showing different pivot arrangements for the same.

As shown each joint comprises two cup-shaped members $a$, $a'$ fitted together and adapted to slide one within the other. The joint member $a'$ has double walls forming an annular chamber or space $b$ for receiving the other joint member $a$ and also a quantity of water or other incompressible liquid which is confined in the chamber or space aforesaid between flexible diaphragms $c$. These diaphragms are formed of rubberized fabric or other material and are clamped between separable parts of the cup-shaped members which are secured by stud screws $d$, bolts or other means. Other impermeable packing may be employed to confine the incompressible liquid which forms a cushion or fluid bearing between the two articulated members distributing the pressure of the external water evenly around the joint and enabling the pressure to be compensated in such a way that there are no unbalanced forces due to external pressure of the water tending to create friction on the pivots of the joint or interfering with the freedom of movement.

In some cases the joints when assembled approximate to a spherical form one joint member being arranged to turn universally within the other but in other cases such as knee joints for example the shape may be suitably modified and the universal movement need not necessarily be provided for.

The spheres in the joints in the limbs working in one direction only such as elbows are held together by a single pivot $e$ Fig. 3; those for the limbs working in all directions, such as shoulders, are hinged by pivots $e$, $e'$ at right angles Fig. 4 so as to form a universal pivot after the style of a globe of the world. Of course these hinges are to hold the dress together when it is out of the water; under working conditions they are quite inactive, the water joint itself acting as a hinge.

Various safety devices can be applied to prevent the rubberized fabric from getting bruised or torn to prevent any grit getting into the joints and to protect the same against accidents in case of leakage.

I claim:—

1. A joint for a diving dress comprising two relatively movable joint members forming between their relatively movable parts a closed chamber, and an incompressible fluid confined in the said chamber and adapted to insure freedom of movement to the joint members and overcome the pressure of the water external to the joint.

2. In a metal diving dress a joint for insuring freedom of movement to the limbs at great depths, said joint comprising articulated joint members, means forming a closed chamber between the said joint members, and an incompressible fluid confined in the said chamber and adapted to form an incompressible but readily displaceable fluid bearing between the articulated joint members.

3. A joint for diving armor comprising articulated members, an incompressible fluid, and means for confining the fluid in the joint so as to insure freedom of movement to the articulated members.

4. A flexible joint for diving dress comprising cup-shaped members fitted together and adapted to slide one within the other, one of said joint members having double walls forming an annular space for receiving the other joint member and means for confining an incompressible liquid in the chamber substantially as and for the purpose described.

5. A joint for diving armor comprising cup-shaped joint members fitted together and adapted to slide one within the other, one of said joint members having double walls forming an annular space for receiving the other joint member and an incompressible liquid, and a diaphragm packing clamped to the joint members and confining the said liquid in the annular space.

6. A joint for the purpose set forth comprising articulated members nad means for confining an incompressible fluid in the joint between inner and outer members thereof.

7. A joint of the character described comprising a member having spaced walls forming a pocket, a second member slidably fitting into the pocket and a carrier for an incompressible fluid positioned in the pocket and having its inner end portion secured at the inner end of the pocket and its outer end portion secured to the inner end portion of the second joint member whereby the flexible fluid carrier may have movement in the pocket with the second member to keep incompressible fluid confined between the walls of the first joint member and inner end portion of the second member.

In testimony whereof he has affixed his signature.

JOSEPH SALIM PERESS